United States Patent [19]

Sakata

[11] Patent Number: 4,757,442
[45] Date of Patent: Jul. 12, 1988

[54] RE-SYNCHRONIZATION SYSTEM USING COMMON MEMORY BUS TO TRANSFER RESTART DATA FROM NON-FAULTY PROCESSOR TO FAILED PROCESSOR

[75] Inventor: Hironobu Sakata, Tokyo, Japan

[73] Assignee: NEC Corporation, Tokyo, Japan

[21] Appl. No.: 874,704

[22] Filed: Jun. 16, 1986

[30] Foreign Application Priority Data

Jun. 17, 1985 [JP] Japan .................. 60-131162
Oct. 28, 1985 [JP] Japan .................. 60-242073
Dec. 23, 1985 [JP] Japan .................. 60-289576

[51] Int. Cl.$^4$ .................. G06F 11/00; G06F 11/30
[52] U.S. Cl. .................. 364/200; 371/47; 371/31; 364/571
[58] Field of Search .................. 364/200 MS, 900 MS, 364/571, 550, 571; 371/31, 10, 13, 47

[56] References Cited

U.S. PATENT DOCUMENTS

| | | | |
|---|---|---|---|
| 3,602,900 | 8/1971 | Delagigue et al. | 364/200 |
| 3,866,184 | 2/1975 | Bohrke et al. | 364/200 |
| 3,911,402 | 10/1975 | McLean et al. | 364/200 |
| 4,015,246 | 3/1977 | Hopkins, Jr. et al. | 364/200 |
| 4,321,666 | 3/1982 | Tasar et al. | 364/200 |
| 4,330,826 | 5/1982 | Whiteside et al. | 364/200 |
| 4,385,351 | 5/1983 | Matsuura et al. | 371/31 |
| 4,589,066 | 5/1986 | Lam et al. | 371/47 |
| 4,654,480 | 3/1987 | Weiss | 371/47 |

FOREIGN PATENT DOCUMENTS

6063660 12/1985 Japan .................. 371/47

*Primary Examiner*—Archie E. Williams, Jr.
*Assistant Examiner*—Danh Thanh Phung
*Attorney, Agent, or Firm*—Foley & Lardner, Schwartz, Jeffery, Schwaab, Mack, Blumenthal & Evans

[57] ABSTRACT

A multi-processing device includes three or more processing systems, each having a processor and a corresponding main memory connected to each other by means of an individual memory bus. The multi-processing device also includes a common memory bus connectable to all the processors and all the main memories of the respective systems, an asynchronism detection circuit connected to the respective processors to produce an asynchronism detection signal indicating which system or systems are in asynchronous state, and a device control circuit responsive to the asynchronism detection signal to send a common memory bus select signal to the main memory of each failed system to change its bus connection from the individual memory bus to the common memory bus. The device control circuit also generates a master designation signal for allowing an arbitrary processor of the normal non-faulty systems to be designated as a master processor, and a copy request signal to the respective processors. The copy request signal causes the master processor to copy the content of the main memory of the normal system to the main memory of each failed system. When the synchronization between the respective systems is established, the device control circuit outputs a restart request signal to the respective processors, thus initiating the execution from a fixed, stored address in a control memory of each processor to enable synchronous starting of all of the processor. The multi-processing device further includes a communication control circuit connected to the common memory bus, thus permitting parallel loading of an initial program to the main memories of the respective systems for achieving recovery in the case where all the systems are asynchronous with each other.

3 Claims, 11 Drawing Sheets

RE-SYNCHRONIZATION SYSTEM USING COMMON MEMORY BUS TO TRANSFER RESTART DATA FROM NON-FAULTY PROCESSOR TO FAILED PROCESSOR

BACKGROUND OF THE INVENTION

The present invention relates to a multiprocessing device in which data processing units are multiplexed for providing an improved reliability.

In general, high reliability technology has two conceptual approaches, that is, the "fault-avoidance" approach and the "fault-tolerance" approach. The fault-avoidance concept is that faults which would cause errors are produced as little as possible, and the fault-tolerance concept is that an erroneous output is not produced even when a fault occurs within the system or, even if such an erroneous output is produced only a slight or negligible influence is given to the externally controlled device.

There are generally two methods for coping with a fault occurrence according to the fault-tolerance concept. One method is to completely mask the internal fault in a manner such that the system correctly functions as viewed externally, although a fault actually exists within the system. The other method is to increase a ratio of (up-time during which the system correctly functions) to (down-time during which the system does not correctly function). The former method is called a "static masking" and the latter method can be considered as a method to improve availability of the system.

Hitherto, there has been known a system based on the fault-tolerance concept which has redundant functional modules of the system, and thereby determines the majority consensus of outputs from the functional modules to provide its result to the next functional module. In this case, even when the output of one functional module is erroneous, such an erroneous output is masked, with the result that a correct input is applied to the functional module of the next stage. Namely, this system can completely mask the faults within the system (i.e. to apply the static mask thereto) so that the system correctly functions when viewed externally, and to prolong a time (up-time) during which the system correctly functions, thereby to improve fault-tolerance ability, although there exist faults within the system.

There has been known in the art a fault-tolerance multi-processor system as shown in U.S. Pat. No. 4,015,246 wherein three resources e.g., processors or memories etc. are grouped together as one unit (which is called a "triad" i.e. three sets). data transfer between these resources of the triad is carried out by using the result of the majority decision of the triad to improve the failure rate of the system. In this system, a triad of processors and a triad of memories are connected by a plurality of (three or more) buses. The individual processors of the triad take the majority consensus of input from the plurality of buses into the respective processors, and the individual memories of the triad take the majority consensus of inputs from the plurality of buses into the respective memories. In this instance, it is required for determining the majority consensus that the triad of processors or the triad of memories operate in synchronism at the clock level. When a single clock generator common to all the resources is used, there is the possibility that the entire system is down due to the fault of this clock generator. Accordingly, each resource determines the majority consensus of clock signals on a plurality of buses, thereby to obtain an internal clock signal. Further, since the plurality of buses are connected commonly to all the triad of processors and the triad of memories, these buses are isolated by duplexed bus guardians and bus isolation gates in order that they are not polluted by an output of a failed resource.

The conventional fault-tolerance multi-processing device stated above is configured so that all resources are interconnected by a plurality of (three or more) buses, and that each resource is provided with a logic circuit for determining the majority consensus of inputs from all the buses, and is further provided with a bus guardian and a bus isolation circuit for preventing the buses from being polluted. For this reason, the drawback with such a conventional device is that the amount of hardware needed for buses and bus input/output control units is increased as the multiplexity of the resources or the number of buses increases.

Further, in view of the processing ability of such a device, a large number of buses leads to the limitation that a broad bit width cannot be expected, with the result that the processing ability of the processor itself is lowered. In addition, since each resource is provided at the input/output control unit with the logic circuit for determining the majority consensus, the bus guardian and bus isolation circuit, there occurs the short-coming that the memory cycle time that the processor accesses into the memory is prolonged, i.e., the processing ability of the entire system is lowered.

In mutli-processing devices in synchronism with a clock, there is required a synchronization at the time of the starting of the system or a synchronization at the time when a processor temporarily separated from the system due to the occurence of a fault is recombined with the system. The essential condition therefore is that the contents of the memories to be subject to synchronization are the same, and that the informations (FFG, REG or flag etc.) within the processors to be subject to synchronization are the same. Under this condition, respective resources are synchronized with each other. It has been known in the art that copying between memories using buses commonly connected to the respective resources is relatively easy. Further, in the case of making a copy of an information within a particular processor (master processor) into another processor (slave processor, a method has been already known to conduct a direct communication from the master processor to the slave processor using buses commonly connected to the respective processors thereby to transfer the information. However, during synchronization of the clock level, it is practically difficult to execute such a direct communication while guaranteeing synchronization between processors, because processings in processors are different from each other.

ordinarily two cases require such a synchronization of the clock. The first case is a synchronous starting of a system from the condition where the system is down. The second case results from the fact that, when a system normally functions on the basis of the majority consensus determination, a failed processor, resulting from the fact that data is broken or intermittently becomes abnormal due to noise etc., is put into synchronization with other normal processors after the failed processor has recovered. In the former case of the synchronous starting of the system, a countermeasure can be taken to concurrently transfer data to multiplexed processors or memories, or start them together by means of an external service processor using a common bus. On the other hand, in the latter case of the recovery and the synchronization of failed processors and failed memories, when a copy of data from normal processors/memories to a failed processor/memory and the timing adjustment thereof are made while continuing the processing required for the system, on the basis of a simple direct communication or a starting and response system utilizing lead wires interconnected between processors, the hardware construction or starting procedures becomes complicated.

SUMMARY OF THE INVENTION

With the above in view, a principal object of the present invention is to economically provide a multi-processing device having an excellent fault-tolerance ability with respect to faults which would intermittently occur in severe environmental conditions.

Another object of the present invention is to provide a multi-processing device which can facilitate detection of the synchronous operation of the respective resources constituting the multi-processing device with a simplified hardware construction.

A further object of the present invention is to provide a multi-processing device which can freely make a copy of the memory contents required for a recovery process from a failure.

A still further object is to provide a multi-processing device wherein when failure occurs, the device can smoothly and easily embody reconstruction of the entire processing system without provision of communication control means over individual systems.

A still more further object is to provide a multi-processing device which can easily realize synchronization at clock level of the processors when a restart request is given to each processor.

To achieve these objects, the present invention provides a multi-processing device comprising: three or more processing systems operable in synchronism for executing the same processing, each system comprising a processor and a main memory connected to each other by means of an individual memory bus, a common memory bus connectable to all the processors and all the memories of the respective system; an asynchronism detection circuit connected with the processors of the systems by means of individual buses, respectively, the asynchronism detection circuit monitoring whether outputs of the respective systems are synchronized with each other or not to produce an asynchronism detection signal indicating which system or systems is or are in asynchronous state when at least one system is asynchronous with other normal system, and a device control circuit responsive to the asynchronism detection signal supplied from the asynchronism detection circuit to recognize which system or systems is or are failed to control such that the failed system or each of failed systems is recovered to the normal state, the device control circuit having a first function to supply a common memory bus select signal to the main memory and the processor of each of the failed systems to change its bus connection from the individual memory bus to the common memory bus, a second function to produce a master designation signal which designates the processor of the normal system or an arbitrary one of processors of the normal systems as a master processor, a third function to supply a copy request signal to the processors of the respective systems, the copy request signal causing the processor designated as the master processor to copy the content of the main memory corresponding to the master processor to the main memory in each of the failed systems via the common memory bus.

The processor of each system is provided with a control memory in which a microprogram is stored. After the copy operation is completed by the processors of the respective systems, when a restart request is given, each microprogram control unit initiates its execution from a fixed address of the microprogram stored in the control memory. Further, the multi-processing device may comprise a communication control circuit connected to the common memory bus, wherein when the device control circuit recognizes that the respective systems are asynchronous with each other on the basis of the asynchronous detection signal from the asynchronism detection circuit, the communication control circuit is operative to load in parallel load an initial program transferred from the external to the main memories of the respective systems.

BRIEF DESCRIPTION OF THE DRAWINGS

The features and advantages of the multiprocessing device according to the present invention will become more apparent from the following description taken in conjunction with the accompanying drawings, in which.

DETAILED DESCRIPTION OF PREFERRED EMBODIMENTS

Figure 1:
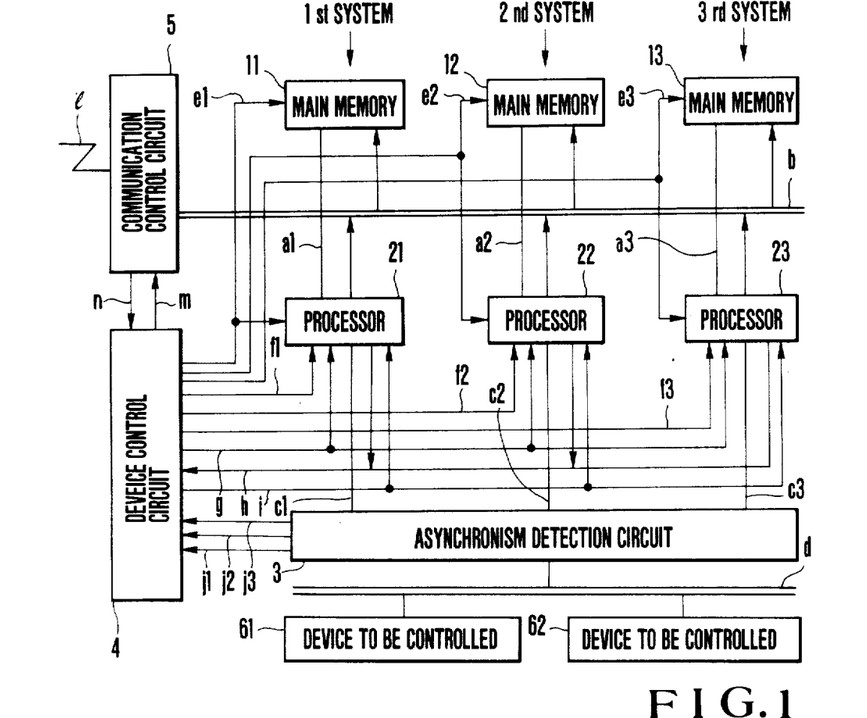
FIG. 1 is a block diagram illustrating an embodiment of the multi-processing device according to the present invention.

Initially, referring to FIG. 1, there is shown, in a block form, a preferred embodiment of a multi-processing device according to the present invention. In this embodiment, the multi-processing device is configured as a triplex processing device physically separated into three sets of circuitry assigned to first, second and third systems, respectively. Within the first system, a main memory 11 and a processor 21 are interconnected by means of an individual bus a1. Likewise, within the second system, a main memory 12 and a processor 22 are interconnected by means of an individual bus a2, and within the third system, a main memory 13 and a processor 23 are interconnected by means of an individual bus a3. The main memory 11 and the processor 21 of the first system are connected with a common memory bus b. Similarly, the main memory 12 and the processor 22 of the second system and the main memory 13 and the processor 23 of the third system are also connected to the common memory bus b. The processors 21, 22 and 23 are connected to an asynchronous detection circuit 3 by means of individual buses c1, c2 and c3, respectively. Units 61 and 62 to be controlled (e.g., a signal control unit and a speech control unit etc.) are connected with the asynchronism detection circuit 3 by means of a common bus d.

Figure 2:
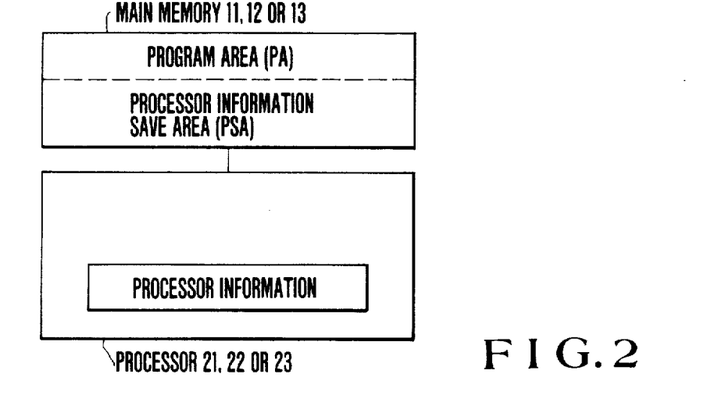
FIG. 2 is a block diagram showing an example of transfer of information between a main memory and a processor provided in the device shown in FIG. 1.

As shown in FIG. 2, each of the main memories 11, 12 and 13 has a program area PA for storing a program and a processor information save area PSA for temporarily storing a processor information transferred from the processor. Further, a memory content of the program area PA of one main memory can be copied into the program area PA of other main memory.

In FIG. 1, a device control circuit 4 is connected with the asynchronism detection circuit 3 through control lines j1, j2 and j3 which carry asynchronism detection signals j1, j2 and j3, respectively. Each of the signals j1, j2 and j3 corresponds to each of the first, second and third systems, respectively, and represents by logical zero (referred to as "0" hereinafter) that the corresponding system is normal and a logical one (hereinafter "1") that the corresponding system is in asynchronism with the other systems. The device control circuit 4 is connected with the main memories 11, 12 and 13 through control lines e1, e2 and e3 respectively. The control lines e1, e2 and e3 respectively carry common memory bus select signals e1, e2 and e3 which correspond to the first, second and third system respectively. Each of the main memories 11, 12 and 13 establishes respective connection with the corresponding processor when the common bus select signal applied thereto is set to "1". For example, when e1=0, e2=0, e3=1, the main memory 13 is connected to the common memory bus b. The device control circuit 4 is connected with the processors 21, 22 and 23 through control lines f1, f2 and f3 which carry master designation signals f1, f2 and f3, respectively. One of the processors 21, 22 and 23 is designated to serve as a master processor when the corresponding master designation signal supplied thereto is set to "1", while the other processors are designated to be slave processors when the master designation signals supplied thereto are set to "0s". For example, when f1=0, f2=1, f3=0, the processor 22 serves as master and the processors 21 and 23 serve as slaves.

Futher, the device control circuit 4 is connected with the processors 21, 22 and 23 through a control line g which carries a copy request signal g from the device control circuit 4 to the processors 21, 22 and 23. As described later in detail, when g="1", a copy operation is carried out, and when g=0, the copy operation is inhibited. The device control circuit 4 and the processors 21, 22 and 23 are interconnected through a control line h which carries a copy end signal h. When the copy operation is completed, the copy end signal h of "1" is sent from the master processor to the device control circuit 4. Further, the device control circuit 4 and the processors 21, 22 and 23 are interconnected through a control line i which carries a restart request signal i which represents that all systems are requested to restart when i="1".

A communication control circuit 5 constituted with e.g., a direct memory access (DMA) controller etc. is connected to one end of an external line 1 and to the above-mentioned common memory bus b, the other end of the external line 1 being connected with a external storage, not shown. The communication control circuit 5 is connected with the device control circuit 4 through lines m and n. The line m carries a transfer request signal m from the device control circuit 4 to the communication control circuit 5. When m="1", a file stored in the external storage is transferred to all systems through the line l, communication control circuit 5 and the common memory bus b. The line n carries a file transfer end signal n sent from the communication control circuit 5 to the device control circuit 4. The file transfer end signal n of "1" represents tha the transfer of the file has completed.

Figure 3:
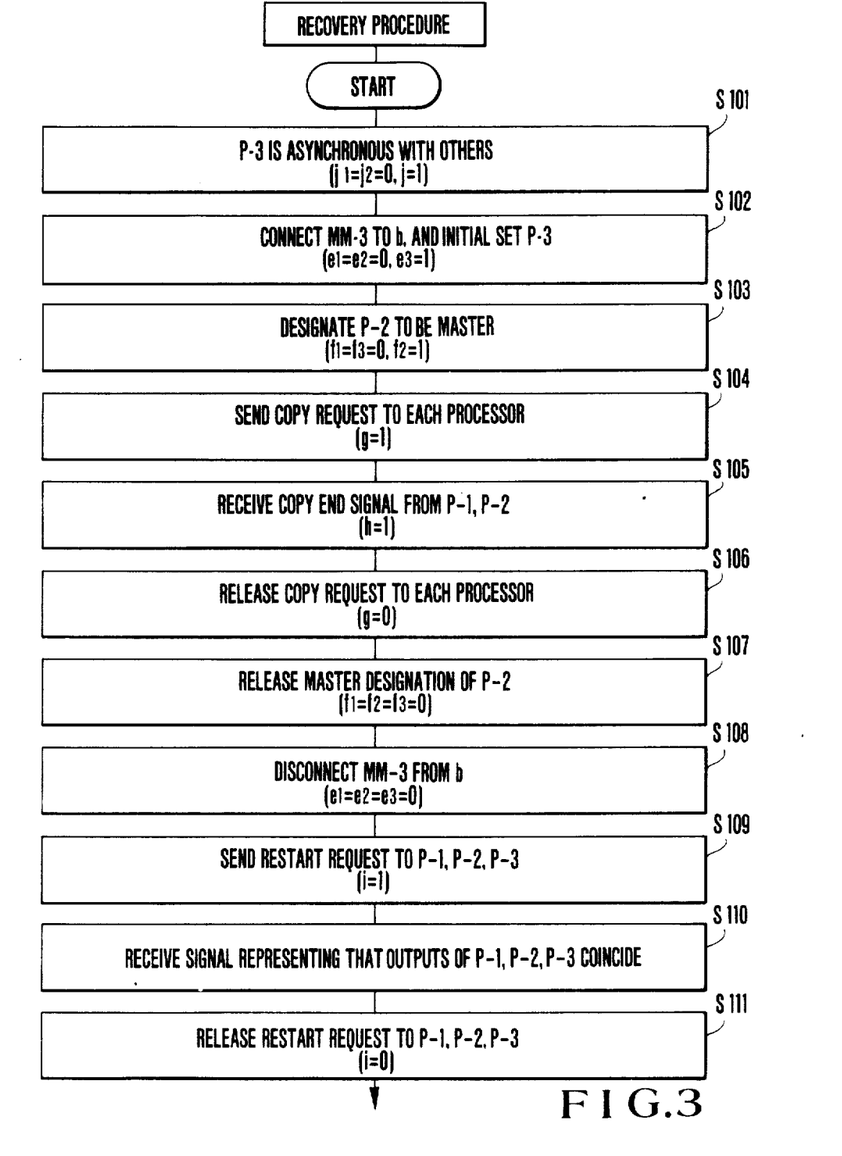
FIG. 3 is a flowchart showing a recovery operation of the device shown in FIG. 1 in the case where an output of the processor of the third system is not coincident with other processor outputs.
Figure 4:
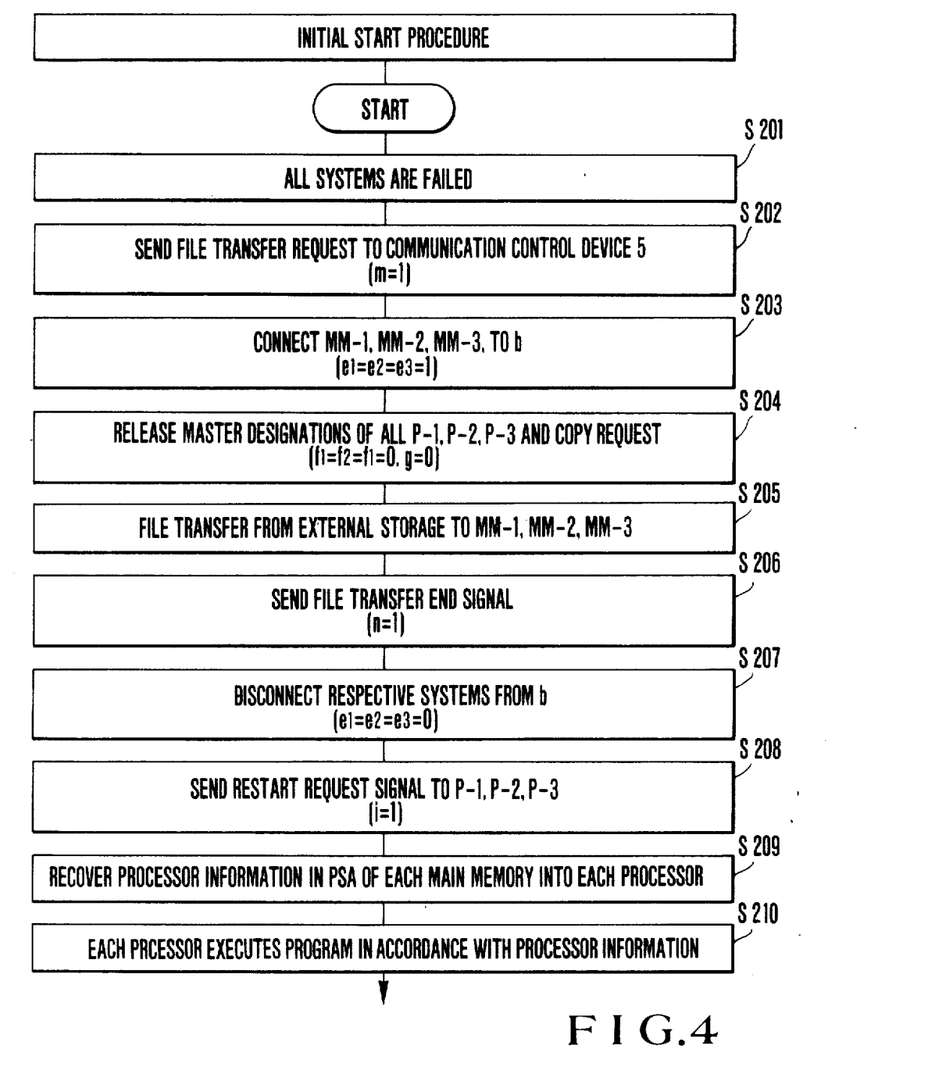
FIG. 4 is a flowchart showing a initial start operation of the device shown in FIG. 1.
Figure 5:
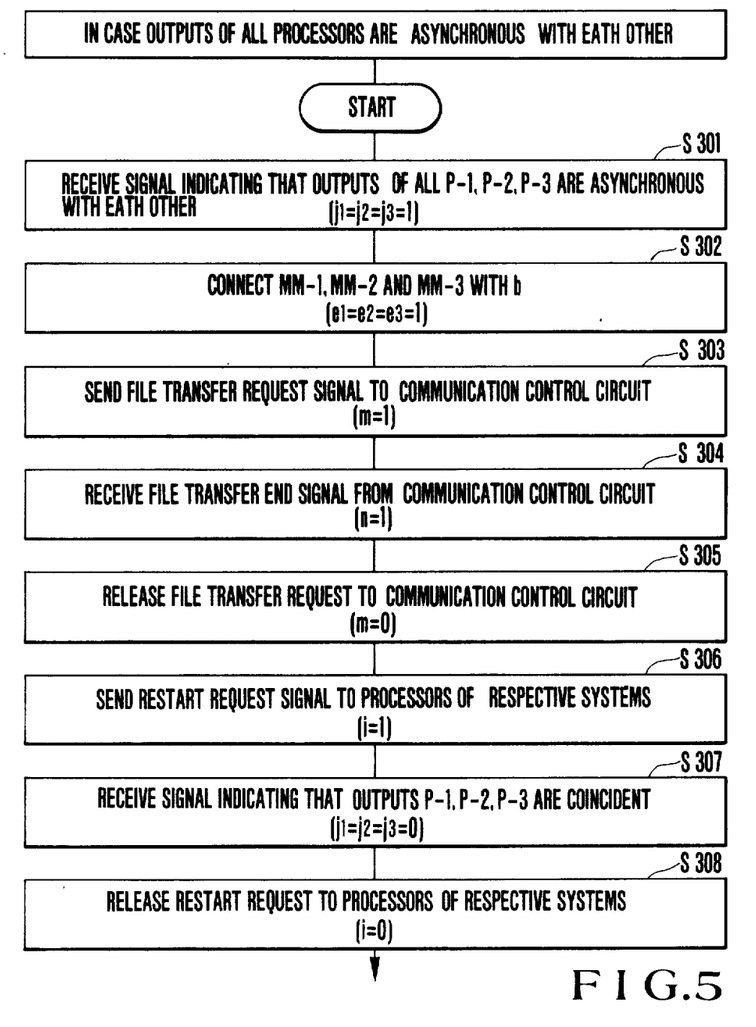
FIG. 5 is a flowchart showing a operation of the device shown in FIG. 1 in the case where output of all the processors are not coincident with each other.

The operation of the multi-processing device in FIG. 1 will now be described with reference to flowcharts shown in FIGS. 3, 4 and 5. For the brevity of explanation, the main memories 11, 12 and 13 are simply called "MM-1", "MM-2" and "MM-3", respectively, and the processors 21, 22 and 23 are also simply called "P-1", "P-2" and "P-3", respectively.

First, a recovery procedure of the above-mentioned triplex processing device in FIG. 1 in the case where the third system is failed will be described with reference to FIG. 3. In an initial condition, data is stored in the program area of MM-1, MM-2 and MM-3, and the same processor information is stored in the area PA of P-1, P-2 and P-3. The area PSA of each memory is vacant. As data transfer between the processors and the memories of the triplex system proceeds with time, the date stored in the above-mentioned areas are changed. Assuming now that the asynchronism detection circuit 3 detects that the third system comprising the MM-3 and the P-3 are in an asynchronous state at a certain time, it is considered that the content of the MM-3 and the processor information of the P-3 are broken as shown at step (S) 101 in FIG. 3. In this instance, the asynchronism detection circuit 3 carries out a majority decision and informs the device control unit 4 of a failure occurrence using the asynchronism detection signals expressed as $j1=j2=0$ and $j3=1$. Thus, the device control circuit 4 recognizes that the MM-3 and the P-3 are have failed.

Then, at S102, the device control circuit 4 sends common memory bus select signals $e_1$ of "0", $e_2$ of "0", $e_3$ of "1" to the MM-1 and the P-1, the MM-2 and the P-2, and the MM-3 and the P-3, respectively. Thus, the MM-3 and the P-3 are connected to the common memory bus b. At S103, the device control circuit 4 sends master designation signals $f_1$ of "0", $f_2$ of "1" and $f_3$ of "0" to the P-1, P-2 and P-3, respectively. Thus, the P-2 functions as a master processor and the remaining P-1 and P-3 function as slave processors. At S104, the device control circuit 4 sends a copy request signal g of "1" to the P-1, P-2 and P-3. Thus, the P-2 is operative to copy the memory content of MM-2 to the MM-3 via the common memory bus b. Then, the processor information of the P-1 is saved in the MM-1, and the processor information of the P-2 is saved in the MM-2 and MM-3. Upon completion of the copy at S105, the P-3 sends a copy end signal h of "1" to the device control circuit 4.

At S106, the device control circuit 4 sends the copy request signal g of "0" to the P-1, P-2 and P-3. Thus, the operation based on the copy request is inhibited. Then, at S107, the device control circuit 4 sends the master designation signals $f_1$, $f_2$ and $f_3$ of all "0" to the P-1, P-2 and P-3, respectively. Thus, the master/slave relation between P-2 and P-1, P-3 is returned to the normal relation. Then, at S108, the device control circuit 4 sends common memory bus select signals $e_1$, $e_2$, and $e_3$ of all "0" to the MM-1 and the P-1, the MM-2 and the P-2, and the MM-3 and P-3, respectively. Thus, the common memory bus b is disconnected from MM-3. At S109, the device control circuit 4 sends a restart request signal i of "1" to P-1, P-2 and P-3. Thus, all the processors P-1, P-2, P-3 are restarted in synchronism. After the synchronization between the respective systems is established, the device control circuit 4 receives outputs j1, j2 and j3 of all "0" indicating that outputs of the respective processors P-1, P-2 and P-3 are coincident with each other (S110). The device control unit 4 then sends a restart rquest signal i of "0", which represents the release of the restart request, to P-1, P-2 and P-3 (S-111). Thus, the processor information saved in the MM-1, MM-2 and MM-3 are recovered by the P-1, P-2 and P-3 which execute the program in accordance with the processor information.

The operation of the starting procedure when all systems are failed will now be described with reference to FIG. 4.

In respective areas PA and PSA of the external storage unit which is not shown in FIG. 1, a predetermined file including program information or data and processor information are stored, respectively. At the time of an initial start of the device, or a restart thereof required when all systems are failed, respective systems each comprising the main memory and the processor are in an asynchronous states (S202).

At S203, the device control device 4 supplies a file transfer request m of "1" to the communication control circuit 5, and also sends common memory bus select signals e1, e2 and e3 of all "1" to the MM-1 and the P-1, the MM-2 and the P-2, and MM-3 and the P-3. As a result, the respective systems are connected to the external storage unit via the common memory bus b. At S204, the device control circuit 4 sends master designation signals $f_1$, $f_2$, and $f_3$ of all "0" and a copy request g of "0" to the respective processors. Thus, the file stored in the external storage unit is transferred into MM-1, MM-2 and MM-3 (S205). Upon completion of this transfer, the communication control circuit 5 sends a file transfer end output n of "1" to the device control circuit 4 (S206). Then, at S207, the device control circuit 4 sends individual memory bus select signals e1, e2 and e3 of all "0" to the respective systems. Thus, the MM-1 and the P-1 are interconnected by the individual memory bus a1, the MM-2 and the P-2 by the individual memory bus a2, and the MM-3 are the P-3 by the individual memory bus a3. Then, at S208, the device control circuit 4 supplies a restart request signal i of "1" to P-1, P-2 and P-3 synchronous with each other. The processor information stored in the save area PSA of each main memory is recovered into each processor (S209). Thus, each processor executes its program in accordance with the processor information (S210).

The operation of the device control circuit in the case where outputs of all the processors are not coincident with each other will be described in detail with reference to FIG. 5, although its outline is substantially the same as the initial procedure shown in FIG. 4.

When the device control circuit 4 receives j1, j2 and j3 of all "1" indicating that outputs of all the processors P-1, P-2 and P-3 are not coincident with each other (S301) from the asynchronism detection circuit 3, it sends common memory bus select signals e1, 32 and e3 of "1" to the all main memories MM-1, MM-2 and MM-3 (S302). Then, the device control circuit 4 supplies a file transfer request signal m of "1" to the communication circuit 5 (S303). When the device control circuit 4 receives a file transfer end signal n of "1" from the communication control circuit 5 (S304), it sends a file transfer request signal m of "0" to the communication control circuit 5 (S305) thereby releasing the file request. Then, the device control circuit 4 supplies a restart request i of "1" to the processors of the respective systems (S306). Then, when the device control circuit 4 receives signals j1, j2 and j3 of all "0" indicating that outputs of all the processors (P-1, P-2 and P-3) are coincident with each other (S307), the device control circuit 4 sends a restart request signal i of "0" to the processors of the respective systems (S308), thereby releasing the restart request.

Figure 6:
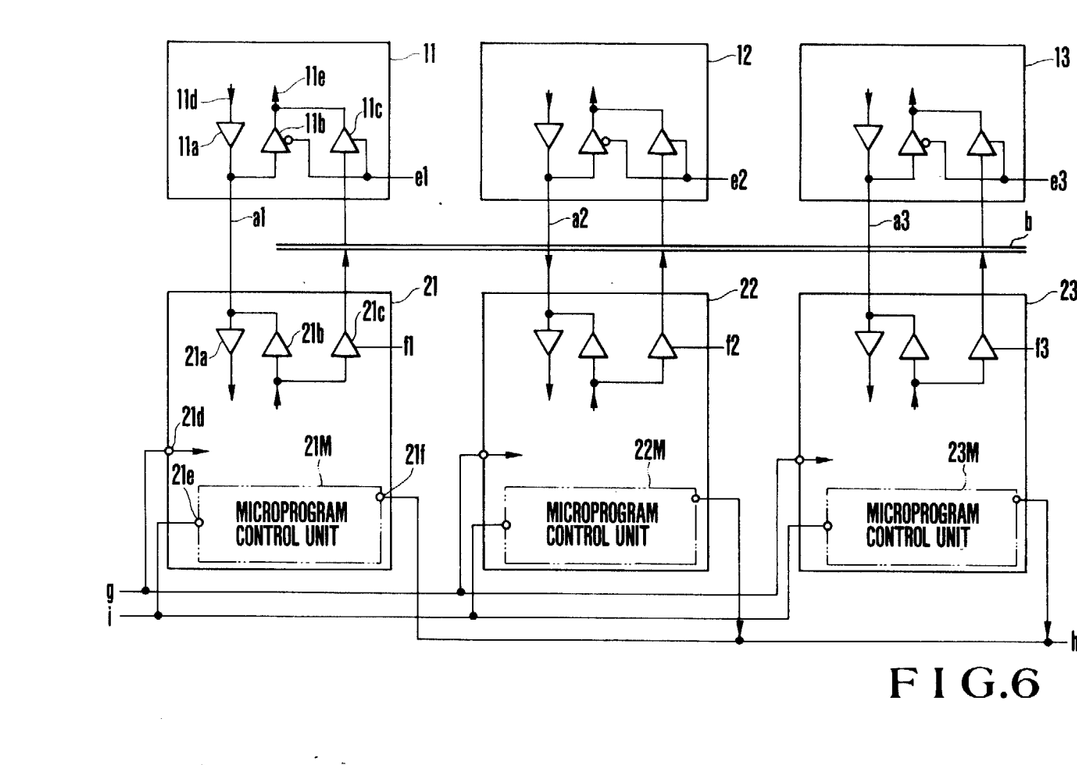
FIG. 6 is a block diagram illustrating a circuit arrangement for transferring data between memories and processors in the device shown in FIG. 1.

FIG. 6 shows the detail of the respective systems shown in FIG. 1. Each system has the same internal circuit configuration. By way of example, only the first system is referred to here. The main memory 11 is provided with a buffer circuit including an output buffer 11a and tristate input buffers 11b and 11c. An input terminal of the output buffer 11a is connected with a data read line 11d through which the content of a memory cell is read out. An output terminal of the output buffer 11a is connected with the individual memory bus a1 and an input terminal of the input buffer 11b. An input terminal of the input buffer 11c is connected with the common memory bus b. Output terminals of the input buffer 11b and 11c are connected together with a data write line 11e through which the data is written into the memory cell. An inverted control terminal of the input buffer 11b and a non-inverted control terminal of the input buffer 11c are connected together with the common bus select control line e1. Thus, the input buffers 11b and 11c are selectively operative to input the data from the processor 21 through either the individual memory bus a1 or the common memory bus b in accordance with the logical level of the common memory bus select signal e1. The processor 21 is provided with a buffer circuit including an input buffer 21a, an output buffer 21b and a tristate output buffer 21c. An input terminal of the input buffer 21a is connected with the individual memory bus a1 and output terminal thereof is connected with a register, not shown. Input terminals of the output buffers 21b and 21c are connected with a register, not shown. Output terminals of the output buffer 21b and 21c are connected with the individual memory bus a1 and the common memory bus b, respectively. A control terminal of the output buffer 21c is connected with the master designation control line f1. The data is output through the output buffer 21c to the common memory bus b when the master designation signal f1 is set to "1". The processor 21 is provided with an input port 21d for the copy request g, and a microprogram control unit 21M which will be described in detail later. The microprogram control unit 21M is provided with a control memory, not shown, which stores a microprogram, an input port 21e for the restart request signal i, and an output port 21f for the copy end signal h. When a restart request signal i is received, the microprogram control unit 21M is operative to initiate its execution from a fixed address of the microprogram stored in the control memory.

Figure 7:
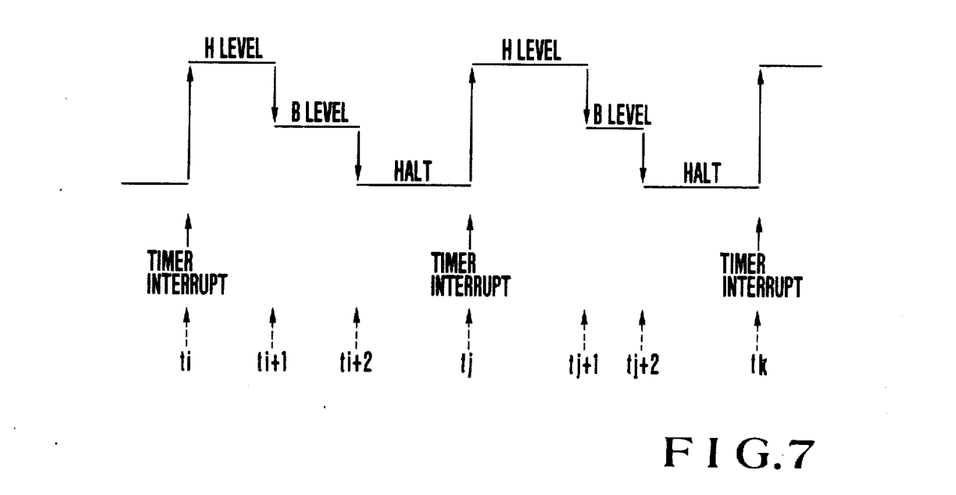
FIG. 7 is a schematic diagram showing program processing state in a normal mode.
Figure 8:
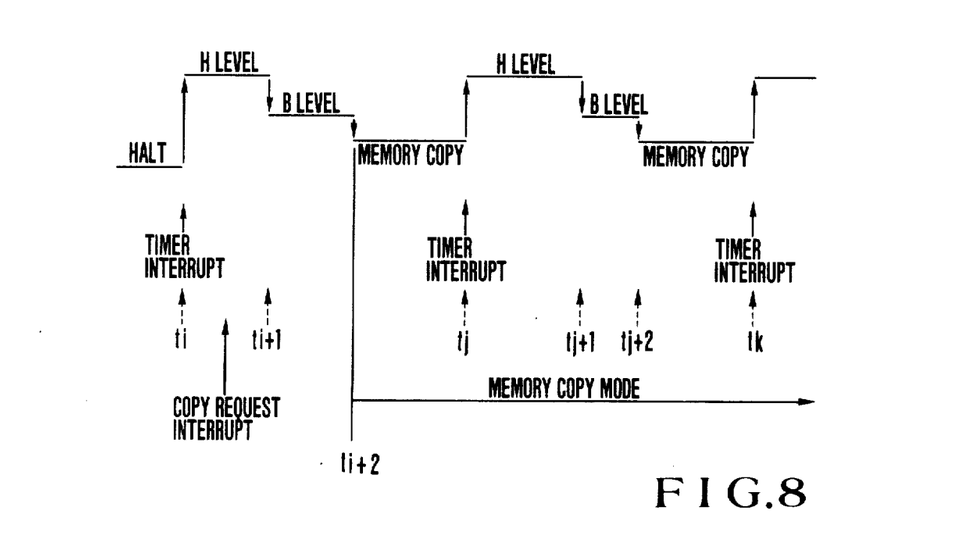
FIG. 8 is a schematic diagram showing a program processing state in a copy mode.

FIGS. 7 and 8 show examples of states of program processing in a normal mode and in a copy mode of the triplex processing device according to the present invention, respectively. As seen from FIG. 8, when each processor receives a timer interruption at time of $t=t_i$, the program processing state shifts from a halt state to a H level to initiable program execution. When $t=t_{i+1}$, the program processing state shifts from the H level to a lower level referred to as a B level. The program processing is maintained at the B level until $t_{i+2}$, and then is returned to the halt state for a second time. Such a halt state is continued until a next timer interruption is given e.g., at $t=t_j$. Subsequently, program processings similar to the above will be repeatedly carried out. It is assumed that a copy request interruption is given during a time period of the H level (from $t_i$ to $t_{i+1}$) as shown in FIG. 8. In this case, the program processing state is the same as that in the normal mode shown in FIG. 8 until $t=t_{i+2}$. When $t=t_{i+2}$, the program processing state shifts to the memory copy mode. In this instance, it is possible to make a memory copy and to save the processor information during halt periods in the normal mode shown in FIG. 8. Accordingly, the processing ability of the system in the copy mode is equivalent to that in the normal mode.

Figure 9:
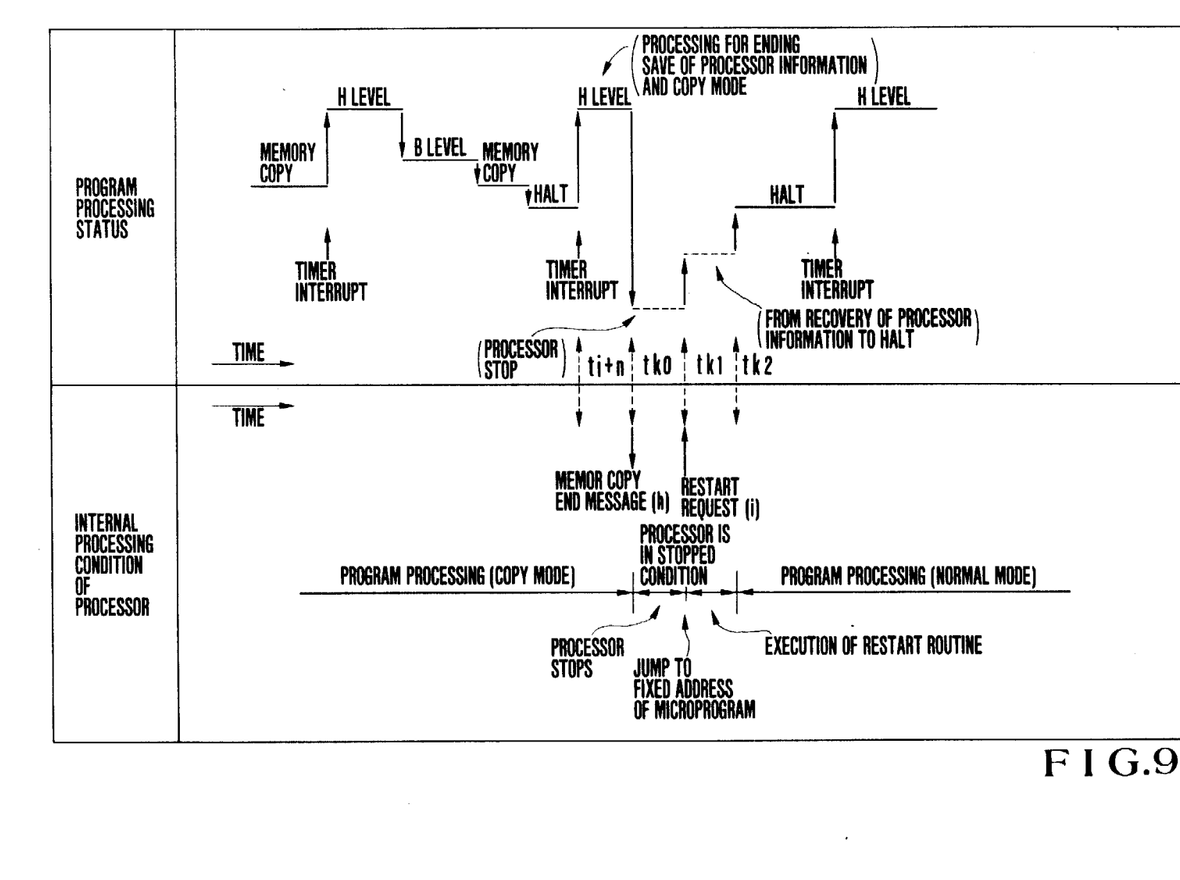
FIG. 9 is a schematic diagram showing a program processing state and an internal processing state of the processor.

Referring to FIG. 9, there is shown the relationship between the state of the program processing and the internal operation of the processor. During a time period of the copy mode, the processor executes a processing routine stored therein. During this time period (until $t_{ko}$), when a timer interruption is given at $t=t_{j+n}$, the program processing state is returned to the H level and the processor executes processings for completing the saving of the processor information and the memory copy mode. Upon completion of such processings, the processor produces the memory copy end signal h and then is stopped. When the restart request signal i is given at $t=t_{k1}$, the program control jumps to a fixed address of the microprogram. Thus, the restart routine is executed. During this time period (from $t=t_{k1}$ to $t=t_{k2}$), the processor information stored in a corresponding main memory is recovered and then the program processing state is set to the halt level. When $t=t_{k2}$, the processor executes the program processing in the normal mode.

Figure 10:
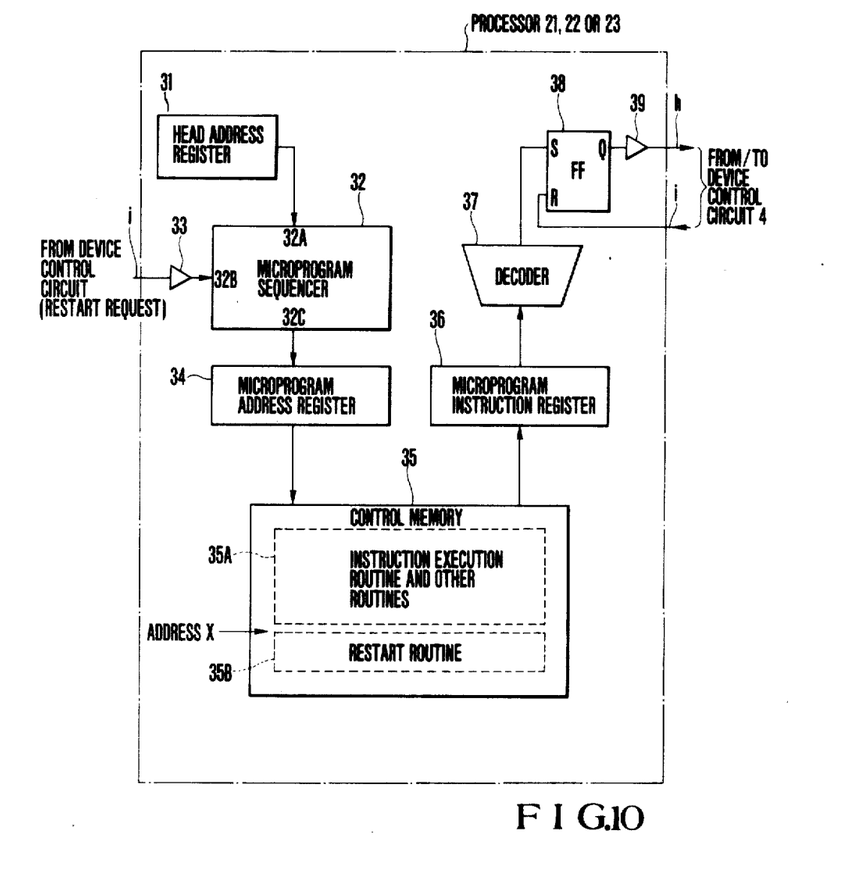
FIG. 10 is a block diagram showing the configuration of a microprogram control within the processor.

Each processor of the triplex processing device according to the present invention is provided with microprogram control circuitry as shown in FIG. 10. In FIG. 10, a register 31 stores and supplies a head address (address X) of the restart routine, and an output terminal thereof is connected with an input terminal 32A of a microprogram sequencer 32 which controls a sequence of the execution of the microprogram. A control terminal 32B of the microprogram sequencer 32 is connected with the restart request control line i through a buffer amplifier 33. An output terminal 32C of the microprogram sequencer 32 is connected with a input terminal of the microprogram address register 34 which has an output terminal connected with an input terminal of the control memory 35 described above as 21M in FIG. 6. The microprogram control memory includes a memory area 35A for an instruction execution routine and other routines and a memory area 35B for the restart routine. The output terminal of the microprogram control memory 35 is connected with an input terminal of a microprogram instruction register 36 which has an output terminal connected with an input terminal of a decoder 37. An output terminal of the decoder 37 is connected with a set terminal S of a flip-flop 38 which has a reset terminal connected with the restart request control line i and an output terminal connected with the copy end control line h via a buffer amplifier 39.

Figure 11:
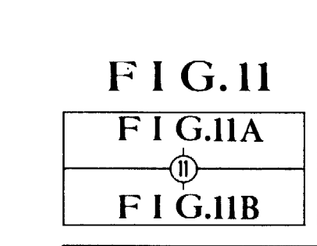
FIGS. 11, 11A–11B, and 12, 12A–12B are flowcharts showing the operations of a master processor and a failed processor, respectively.
Figure 11A:
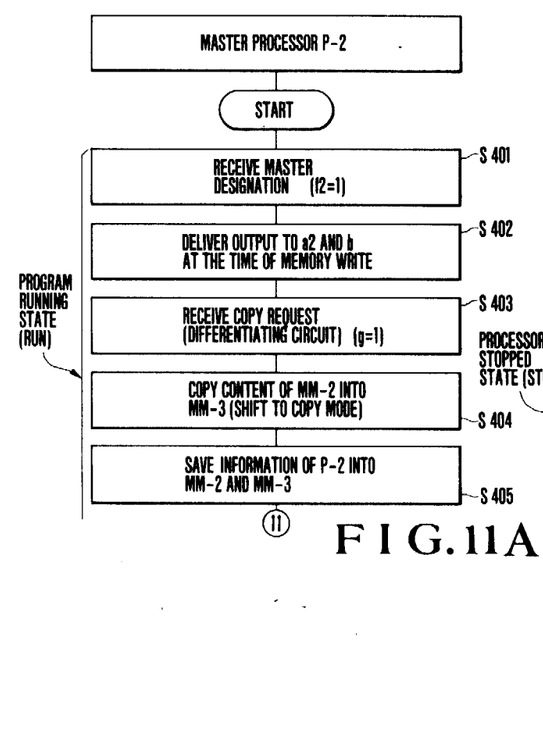
Figure 11B:
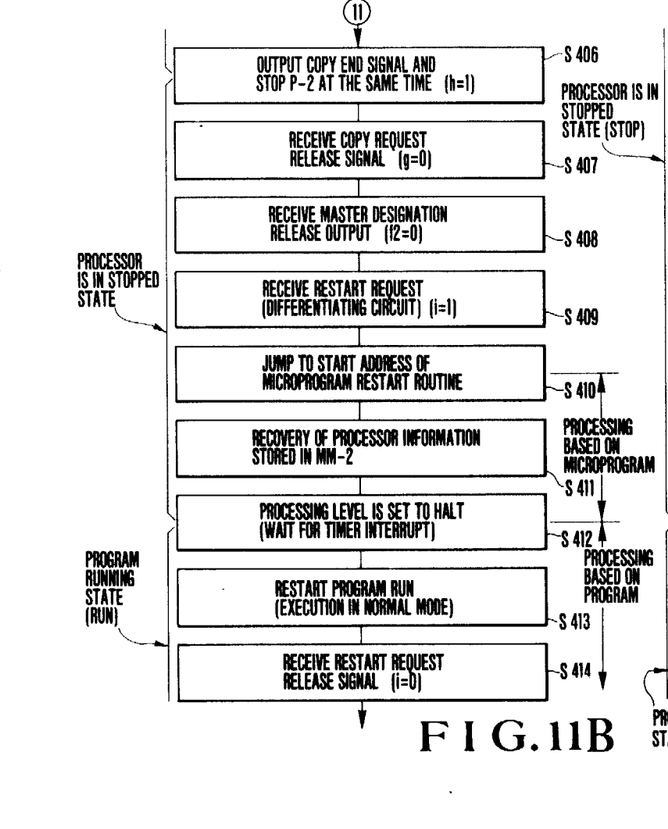
Figure 12:
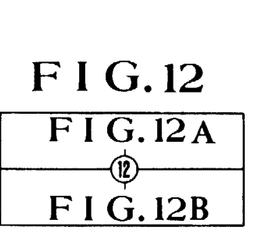
Figure 12A:
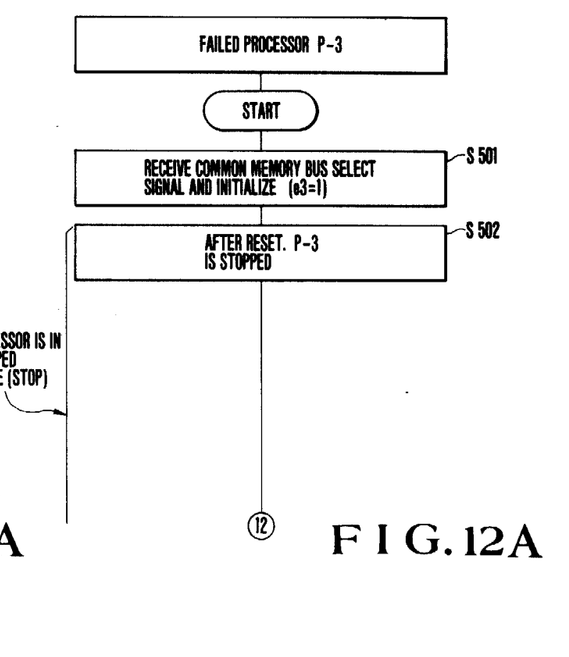
Figure 12B:
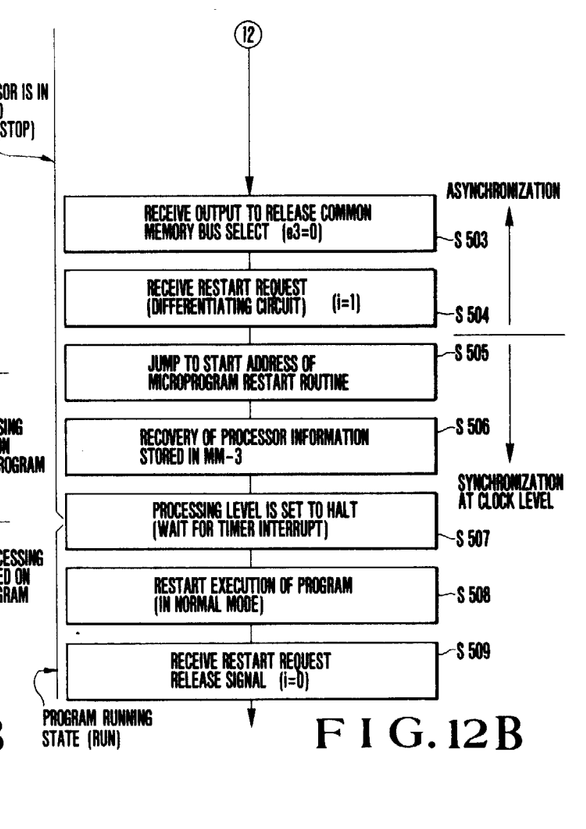

The operations of P-2 and P-3 in case that P-3 is failed and P-2 is designated to be the master will now be described with reference to FIGS. 11 and 12. FIGS. 11 and 12 respectively show the flowcharts of P-2 and P-3 concurrently executed. The processing steps of P-2 and P-3 are correspondingly described at the left and right sides, respectively.

Initially, when P-2 receives a master designation signal f2 of "1" (S401), P-2 designated as the master processor produces an output to the individual memory bus a2 and at the same time produces an output to the common memory bus b at the time of the memory write operation (S402). Then, when P-2 receives a copy request g of "1" (S403), it copies the memory contents of the entire area of the MM-2 into MM-3 (S404). Thus, the program processing state shifts to the copy mode. At S405, P-2 saves the own processor information into MM-2 and MM-3. Upon completion of sending of the copy end output h, P-2 receives a copy request signal g of "0" (S407), it receives a master designation signal f2 of "0" (S408). Then, when P-2 receives a restart request i of "1" (S409), the program execution jumps to a start address of the restart routine of the microprogram (S410). Then, the processor information stored in the own MM-2 is recovered (S411). Thus, P-2 is set in a halt state, wherein it waits for a timer interruption (S412). Then, P-2 restart the execution of the program in the normal mode (S413). Finally, P-2 receives a restart request signal i of "0" (S412).

On the other hand as shown in FIG. 12, the failed processor P-3 operates as follows. When the P-3 receives a common memory bus select signal e3 of "1" (i.e. initial set output) (S501), it is reset and then stopped (S502). The copy from MM-2 to MM-3 is carried out. Then, at S503 P-3 receives a common memory bus select signal e3 of "0". Thus, the initial set is released. Then, when P-3 receives a restart request signal of $i=$"1" (S504), the program control jumps to a start address of the restart routine of the microprogram (S505). Then, the processor information stored in MM-3 is recovered (S506). In the subsequent steps S507, S508 and S509, operations similar to those in the S412, S413 and S414 in FIG. 11 are carried out, respectively.

Figure 13:
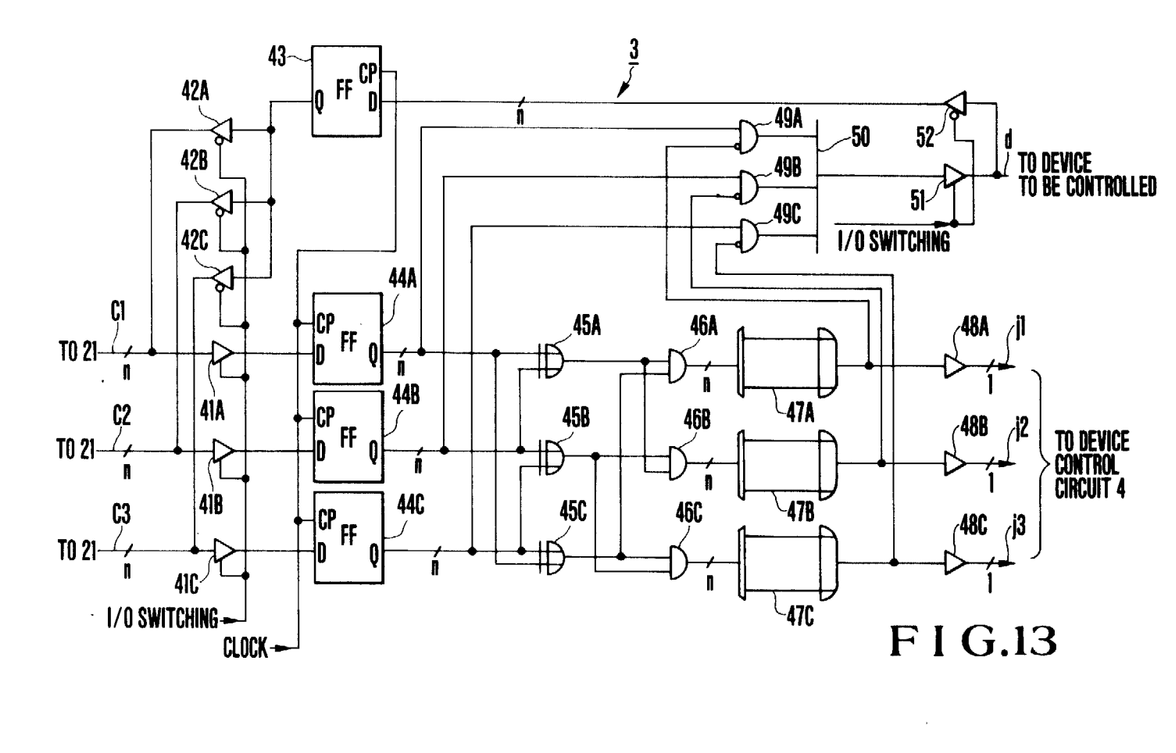
FIG. 13 shows a circuit arrangement of an asynchronism detection circuit employed in the present invention.

FIG. 13 shows the detail of the internal configuration of the synchronism detection circuit 3 shown in FIG. 1. In FIG. 13, the individual buses c1, c2 and c3 are connected with input terminals of three tristate input buffers 41A, 41B and 41C and output terminals of three tristate output buffers 42A, 42B and 42C, respectively. Control terminals of the input buffer 41A to 41C and inverted control terminals of the output buffer 42A to 42C are connected together with a input/output switching circuit, not shown. Output terminals of the input buffer 41A to 41C are connected with D input terminals of D-type flip-flops 44A to 44C, respectively. Input terminals of the output buffer 42A to 42C are connected with Q output terminal of a D-type flip-flop 43. Clock terminals CPs of the flip-flop's 43, 44A to 44C are connected together to a clock generator, not shown. Q terminals of the flip-flop's 44A, 44B and 44C are connected with one input terminals of exclusive-OR gates 45A, 45B and 45C, respectively. Other input terminals of the exclusive-OR gates 45A, 45B and 45C are connected with the one input terminals of the exclusive-OR gates 45B, 45C and 45A, respectively. The exclusive-OR gates 45A, 45B and 45C detect asynchronisms between first and second systems, second and third systems, and third and first systems, respectively. Output terminals of the exclusive-OR gates 45A, 45B and 45C are connected with one input terminals of AND gates 46A, 46B and 46C, respectively. The other input terminals of the AND gates 46A, 46B and 46C are connected with the one input terminals of the AND gates 46C, 46A and 46B, respectively. Output terminals of the AND gates 46A, 46B and 46C are connected with input terminals of exclusive-OR gates 47A, 47B and 47C, respectively. Output terminals of the exclusive-OR gates 47A, 47B and 47C, respectively. Output terminals of the exclusive OR gates 47A, 47B and 47C are connected to asynchronism detection control lines j1, j2 and j3 through buffer amplifiers 48A, 48B and 48C, respectively.

The Q outputs of the flip-flop's 44A, 44B and 44C are connected with one input terminals of AND gates 49A, 49B and 49C, respectively. The other input terminals of the AND gates 49A, 49B and 49C are connected with the output terminals of the exclusive-OR gates 47A, 47B and 47C, respectively. Output terminals of the AND gates 49A to 49C are connected with an input terminal of an OR gate 50 which has an output terminal connected with an input terminal of a tristate output buffer 51. A D input terminal of the flip-flop 43 is connected with an output terminal of a tristate input buffer 52 which has an input termanl connected with an output terminal of the tristate output buffer 51 and the common bud d. Non-inverted and inverted control terminals of the tristate buffer 51 and 52 are connected together with the input/output switching circuit.

As stated above in detail, the multi-processing device according to the present invention can provide the following advantages.

(1) The multi-processing device employs a simple circuit configuration such that the respective systems are connected to the asynchronism detection circuit by means of individual buses, respectively, and that the asynchronism detection circuit is connected to devices to be controlled by means of the common bus. Accordingly, this can facilitate detection of the synchronous operation of the respective systems. Further, when the number of systems is three or more, this multi-processing device can substantially completely continue data processing without error as long as at least two systems are in normal state.

(2) This multi-processing device employs a circuit configuration such that the processor and the main memory within the same system are directly interconnected by the individual memory bus to effect a normal operation by making use of this individual memory bus, and that memory copy from one normal system to one or more failed systems is carried out by the use of the common memory bus shared by the processors and the main memories of all the systems. Accordingly, when memory copy is needed, it is possible to freely make a memory copy from an arbitrary system to other arbitrary systems with a simplified configuration.

(3) In addition, this multi-processing device excludes communication control between processors over systems, and employs the asynchronism detection circuit and the device control circuit to produce common memory bus select signal, master designation signal, copy request signal, copy end signal, restart request signal, and asynchronism detection signal etc., thus making it possible to easily determine system configuration at the time of failure to prevent any faults from being extended over other systems.

(4) In accordance with this multi-processing device, the processors of the respective system each includes a control memory in which a microprogram is stored, and the respective device control circuits are operative to execute microprograms for a predetermined address at the same time, when the restart request singal is given to each system. Thus, this system can easily realize synchronization at the machine level of the processors of the respective systems.

(5) In addition, the multi-processing device is provided with the communication control circuit connected to the common memory bus and activated by data transfer request from the device control circuit. This configuration makes it possible to directly transfer an initial program to all the main memories within the respective systems in an independent fashion without aid of the processors therewithin. As a result, this can eliminate the master designation of the system at the time of the initial state of the device of at the time of its restart which is required where all systems are failed, resulting in simplified hardware construction. Thus, the present invention can economically provide a multi-processing device having little down-time.

This multi-processing device according to the present invention is suitable for a system for spacecraft e.g. artificial satellite etc. travelling in space in which soft erros due to radioactive radiation is likely to occur and high reliablity is required, a system in which system downtime is not permitted under conditon where data corruption is apt to occur due to temperature or power noise, or electromagnetic noise etc., or the like.

What is claimed is:

1. A synchronization control system for a multiple computer system comprising:
  (a) three or more processing system operating in synchronism for executing the same processing, each processing system comprising a processor and a corresponding main memory connected to each other by means of an individual memory bus;
  (b) a common memory bus connected to all the processors and all the memories of said processing system;
  (c) an asynchronism detection circuit connected with said processors of said processing systems by means of individual buses, respectively, for monitoring whether outputs of said processing systems are synchronized with each other or not, and producing an asynchronism detection signal indicating an asynchronous state of a processing system which is operating asynchronously with respect to the remaining processing systems; and
  (d) a device control circuit responsive to sa dasynchronism detection signal supplied from said asynchronism detection circuit for recovering said asynchronous processing systems, said device control circuit including:
    (1) means for generating a common memory bus select signal to the main memory and the processor of said asynchronous processing system for connecting said main memory and said processor of said asynchronous processing system to said common memory bus, (2) means for generating a master designation signal to the processor of one of said remaining processing systems to designate said processor as a master processor, (3) means fopr generating a copy request signal to all processors of all processing systems, said copy request signal causing the master processor to store processor information of said master processor in the main memory of said master processor and in the main memory of said asynchronous processing system via said common memory bus, and processor information of each of the remaining processors into the corresponding main memory of the remaining processing systems, (4) means, operative upon reception of a copy end signal sent from the processor of said asynchronous processing system for generating (i) a signal for releasing the copy request to allprocessors of said processing systems, (ii) a signal for relasing the master designation of said master processor, and (iii) a signal for releasing the common memory bus selection, (5) means for generating a restart request signal to all processors of said processing systems, said restart request signal causing the processors to recover said processor information stored in said main memories into the processors of said processing systems respectively, and to restart processings of said processors in synchronism with one another, and (6) means for determining whether outputs of said processors of said processing systems are coincident with each other, and in the event of coincidence, to output a signal to all processors for releasing said restart request signal.

2. A multi-processing device as set forth in claim 1, wherein each of said main memories of said processing systems has a buffer circuit incuding an output buffer connected to the corresponding individual memory bus for outputting a read data to the corresponding processor therethrough, and a pair of tristate input buffers, one connected to said corresponding individual memory bus, the other connected to said common memory bus, wherein said pair of buffers depends upon which control input is enabled by said common memory bus select signal to input a data to be written via either said corresponding individual memory bus or said common memory bus.

3. A multi-processing device as set forth in claim 1, wherein each of said processors of said respective processing systems has a buffer circuit including an input buffer connected to the corresponding individual memory bus for inputting a read data from the corresponding main memory therethrough, an output buffer connected to said corresponding individual memory bus for outputting a data to be written to said corresponding main memory therethrough, and a tristate output buffer connected to said common memory bus for outputting said data to be written via said common memory bus when a control terminal of said tristate output buffer is enabled by said master designation signal.

* * * * *